US009214876B2

(12) United States Patent
Vinnikov et al.

(10) Patent No.: US 9,214,876 B2
(45) Date of Patent: Dec. 15, 2015

(54) METHOD OF SHOOT-THROUGH GENERATION FOR MODIFIED SINE WAVE Z-SOURCE, QUASI-Z-SOURCE AND TRANS-Z-SOURCE INVERTERS

(75) Inventors: Dmitri Vinnikov, Tallinn (EE); Tanel Jalakas, Tallinn (EE); Indrek Roasto, Tallinn (EE); Hannes Agabus, Tallinn (EE); Kristi Tammet, Tallinn (EE)

(73) Assignee: Tallinn University of Technology, Tallinn (EE)

( * ) Notice: Subject to any disclaimer, the term of this patent is extended or adjusted under 35 U.S.C. 154(b) by 79 days.

(21) Appl. No.: 14/001,891

(22) PCT Filed: Feb. 28, 2012

(86) PCT No.: PCT/EE2012/000002
§ 371 (c)(1),
(2), (4) Date: Aug. 28, 2013

(87) PCT Pub. No.: WO2012/116708
PCT Pub. Date: Sep. 7, 2012

(65) Prior Publication Data
US 2013/0329477 A1 Dec. 12, 2013

(30) Foreign Application Priority Data
Feb. 28, 2011 (EE) .................................. 201100013

(51) Int. Cl.
*H02M 7/5387* (2007.01)
*H02M 7/523* (2006.01)
*H02M 7/48* (2007.01)

(52) U.S. Cl.
CPC ............ *H02M 7/523* (2013.01); *H02M 7/4826* (2013.01)

(58) Field of Classification Search
USPC ............... 363/16, 17, 40, 41, 56.02, 131, 132
See application file for complete search history.

(56) References Cited

U.S. PATENT DOCUMENTS

| 5,784,267 | A | 7/1998 | Koenig et al. |
| 2003/0231518 | A1 | 12/2003 | Peng |
| 2009/0066271 | A1 | 3/2009 | Kajouke et al. |
| 2011/0188272 | A1* | 8/2011 | Smedley et al. ................. 363/37 |

FOREIGN PATENT DOCUMENTS

WO 94/21021 A1 9/1994

OTHER PUBLICATIONS

PCT Search Report dated Sep. 17, 2012 of Patent Application No. PCT/EE2012/000002 filed Feb. 28, 2012.
(Continued)

*Primary Examiner* — Nguyen Tran
(74) *Attorney, Agent, or Firm* — Maine Cernota & Rardin

(57) ABSTRACT

This invention belongs into the field of power electronics and semiconductor converter control and pertains to the method of shoot-through generation for modified sine wave Z-source, quasi-Z-source and trans-Z-source inverters. The inverter can be controlled using either the modified sine wave pulse-width modulation or phase-shift modulation method. There are three methods for shoot-through generation in the case of modified sine wave control: by overlapping active states, during the freewheeling state and during the zero state. To equalize switching losses in the case of unsymmetrical switching patterns, control signals of upper and lower switching elements are periodically interchanged.

8 Claims, 5 Drawing Sheets

(56) References Cited

OTHER PUBLICATIONS

Peng, Fang Zheng, "Z-Source Inverter", IEEE Transactions on Industry Applications, Mar./Apr. 2003, pp. 504-510, vol. 39, No. 2.

Park, Kiwoo et al., "A Z-Source Sparse Matrix Converter Under a Voltage Sag Condition", IEEE, 2010, pp. 2893-2898.

Bisenieks, Lauris et al., "New Isolated Interface Converter for Grid-Connected PMSG Based Wind Turbines", IEEE, 2011, 4 pgs.

Roasto, Indrek et al., "Analysis and Evaluation of PWM and PSM Shoot-Through Control Methods for Voltage-Fed qZSI Based DC/DC Converters", IEEE, 2010, pp. T3-100-T3-105.

Roasto, Indrek et al., "Experimental Study of Shoot-Through Control Methods for qZSI-Based DC/DC Converters", IEEE, 2010, pp. 29-34.

Vinnikov, Dmitri et al., "An Improved High-Power DC/DC Converter for Distributed Power Generation", IEEE, 2009, 6 pgs.

Vinnikov, Dimitri et al., "Impact of Component Losses on the Voltage Boost Properties and Efficiency of the qZS-Converter Family", IEEE, 2011, pp. 303-308.

Vinnikov, Dimitri et al., "New High-Gain Step-Up DC/DC Converter with High-Frequency Isolation", IEEE, 2012, pp. 1204-1209.

Vinnikov, Dimitri et al., "New Step-Up DC/DC Converter with High-Frequency Isolation", IEEE, 2009, pp. 670-675.

Vinnikov, Dmitri et al., "New Step-Up DC/DC Converter for Fuel Cell Powered Distributed Generation Systems: Some Design Guidelines", Przeglad Elektrotechniczny (Electrical Review), Aug. 2010, pp. 245-252.

Vinnikov, Dmitri et al., "Performance Improvement Method for the Voltage-Fed qZSI with Continuous Input Current", IEEE, 2010, pp. 1459-1464.

Vinnikov, Dmitri, "Quasi-Z-Source-Based Isolated DC/DC Converters for Distributed Power Generation", IEEE Transactions on Industrial Electronics, Jan. 2011, pp. 192-201, vol. 58, No. 1.

Zakis, J. et al., "Soft-Switching Capability Analysis of a qZSI-based DC/DC Converter", IEEE, 2010, pp. 301-304.

Zakis, J. et al, "Some Design Considerations for Coupled Inductors for Integrated Buck-Boost Converters", IEEE, 2011, 6 pgs.

\* cited by examiner

МЕТHOD OF SHOOT-THROUGH
GENERATION FOR MODIFIED SINE WAVE
Z-SOURCE, QUASI-Z-SOURCE AND
TRANS-Z-SOURCE INVERTERS

RELATED APPLICATIONS

This application is a national phase entry filed under 35 USC X371 of PCT Application No. PCT/EE2012/000002 with an International filing date of 28 Feb. 2012, which claims the benefit of Estonian Application No. P201100013, filed 28 Feb. 2011. Each of these applications is herein incorporated by reference in their entirety for all purposes.

TECHNICAL FIELD

This invention belongs in the field of power electronics and semiconductor converter control and pertains to the methods of shoot-through generation for modified sine wave Z-source, quasi-Z-source and trans-Z-source inverters.

BACKGROUND ART

Z-source, quasi-Z-source and trans-Z-source inverters are new DC/AC (voltage) converters in power electronics. These make it possible to both increase and decrease input voltage without additional switching elements. These converters consist of an LC circuit (of Z-source, quasi-Z-source or trans-Z-source-type) and a single-phase or multi-phase inverter (FIG. 1). The voltage amplitude is increased by a specific shoot-through state that is generated by turning on the switching elements of one bridge arm of the inverter simultaneously. In this case, the energy of the magnetic field is accumulated in the chokes of LC circuits without short-circuiting the capacitors during the shoot-through. The accumulated energy is used to increase the voltage of the DC-link during the traditional conductivity phase that follows the shoot-through. Such inverters are meant for various power electronics applications where flexible control and reliability of a device are especially important.

So far, Z-source, quasi-Z-source and trans-Z-source inverters have been controlled using sine wave modulation with shoot-through states, i.e. pulse-width modulation where the aim is to shape the output voltage in a way that near-sine current is generated. Typically, shoot-through is generated during zero states. As a result, shoot-through zero states occur whereby active states remain constant and zero states are reduced by the amount of shoot-through. Sine wave modulation with shoot-through states has mainly been used to control electric motors and link alternative and renewable energy sources to AC-power grids. The disadvantages of sine wave modulation are its rather complicated control algorithm and the fact that low-frequency sine signals cannot pass through a high-frequency pulse transformer in applications requiring galvanic insulation. To solve the problem, Z-source, quasi-Z-source, and trans-Z-source inverters are controlled using modified sine wave modulation methods with shoot-through states: pulse-width modulation (PWM) or phase-shift modulation (PSM). In both these methods the goal is not to generate sinusoidal current but a simple square wave signal with fixed duty ratio that can most efficiently pass an insulation transformer. And the control algorithm is simpler and burdens the control system less. A shoot-through state is added to the modified sine wave signal and the relative duration of the shoot-through determines the voltage amplitude of the DC-link. Shoot-through states are distributed across the period in a way that the number of higher harmonics would be minimal in the output voltage of the inverter. To reduce the switching and conductivity losses, the number of shoot-through states per switching period is limited to two and the shoot-through current is distributed equally across the transistors of both arms of the inverter.

In the case of PSM, the pulse width is kept constant. The output of the inverter is adjusted by changing the mutual phase angle of the control signals and the duration of a shoot-through (FIG. 5). In the case of PSM, a shoot-through is generated during zero states. The prerequisite is that the duration of the zero state ($t_z$) is longer than the maximum duration of the shoot-through state. The switching period consists of three parts: an active state, a shoot-through state and a zero state. In contrast to the PWM method, where one group of switching elements (either the upper or lower one) constantly generates zero states, here, the upper and lower switching element groups take turns to generate a zero state. This ensures equal operating frequency of the switching elements. If the operating frequency of switching elements is equal, the switching losses are equal as well and the switching elements have an equal load.

Patent US005784267A concerning a modified sine wave method is already known. An AC converter is controlled using a modified sine wave method without shoot-through states. The disadvantage of this method is that the voltage cannot be increased.

Also, a Z-source inverter described in US2009066271 is known. The Z-source inverter is used for generating a three-phase sine voltage. The voltage is increased by shoot-through states integrated into the control algorithm. The disadvantage of the described solution is that it applies only to sine wave modulation and does not determine the methods for shoot-through generation.

Furthermore, a current source inverter described in WO9421021 is also known. Some switching elements, a capacitor and two chokes are added to a three-phase current source inverter to achieve soft switching. The inverter operates using sine wave modulation. The disadvantage of the inverter is that it does not enable to generate freewheeling, zero or shoot-through states.

DISCLOSURE OF THE INVENTION

The switching period of a Z-source, quasi-Z-source and trans-Z-source inverter may consist of the following states: zero, freewheeling, active and shoot-through. The zero state is when the load is short circuited by switching on all upper or lower switching elements of the inverter simultaneously. The freewheeling state is achieved when all switching elements of an inverter are switched off simultaneously, and no current is generated in the output of the inverter. The active state occurs when only one switching element in each bridge arm of the inverter is turned on and current is generated in the output of the inverter. The shoot-through state occurs when top and bottom switching elements of a bridge arm or all switching elements of a bridge are switched on simultaneously.

There are three methods for shoot-through generation in the case of modified sine wave control: by overlapping active states, during the freewheeling states or during the zero states.

BRIEF DESCRIPTION OF THE DRAWINGS

FIGS. 1-5 contain the following symbols:
1—input voltage source
2—Z-source, quasi-Z-source or trans-Z-source circuit
3—single-phase or multi-phase inverter
4—transformer, AC motor, AC load, etc.
T1, T2, T3, T4—switching elements of the inverter
$U_{out}$—output voltage of the inverter
$U_P$—positive reference voltage for shoot-through generation
$U_N$—negative reference voltage for shoot-through generation

MODE FOR CARRYING OUT THE INVENTION

The principle of the invention is described on the basis of a single-phase inverter. The voltage from the input voltage source (1) is directed through the Z-source, quasi-Z-source or trans-Z-source circuit (2) into a single- or multi-phase inverter (3). The inverter (3) consists of switching elements T1, T2, T3 and T4 (the inverter may also be a multi-phase one). The inverter can be controlled using either the modified sine wave pulse-width modulation (PWM) or phase-shift modulation (PSM) method. A transformer, an AC motor, an AC load, etc., are connected to the output of the inverter (3). Zero, freewheeling and shoot-through states are distributed across the period (T) in a way that the number of higher harmonics is minimal in the output voltage of the inverter. To reduce the switching and conductivity losses, the number of shoot-through states per switching period is limited to two and the shoot-through current is distributed equally across the transistors of both arms of the inverter.

In the case of PWM, the control signals have a constant period and phase shift. The output voltage of the inverter is adjusted by changing the pulse width and the duration of a shoot-through. There are three methods one can choose from to generate shoot-through states: by overlapping active states, during the freewheeling state and during the zero state.

Figure 1:
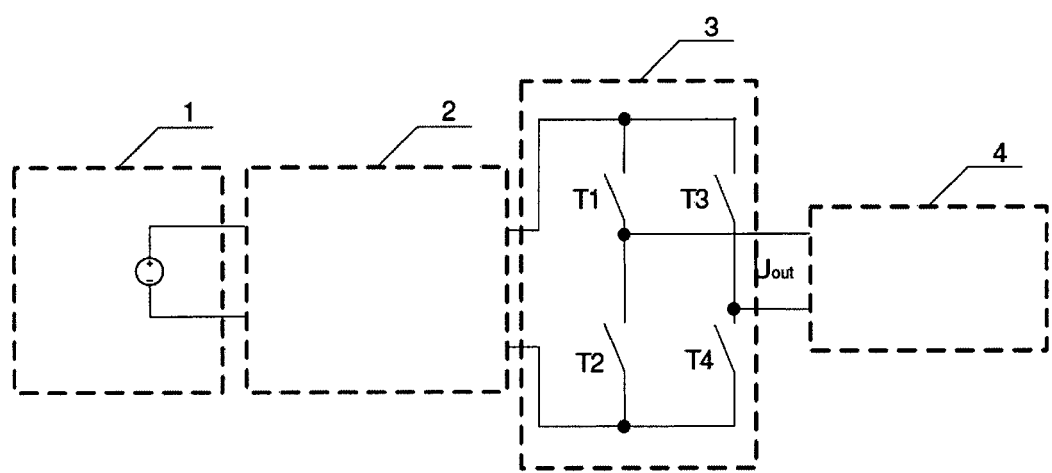
FIG. 1 depicts the circuit diagram of a Z-source, quasi-Z-source or trans-Z-source inverter.
Figure 2:
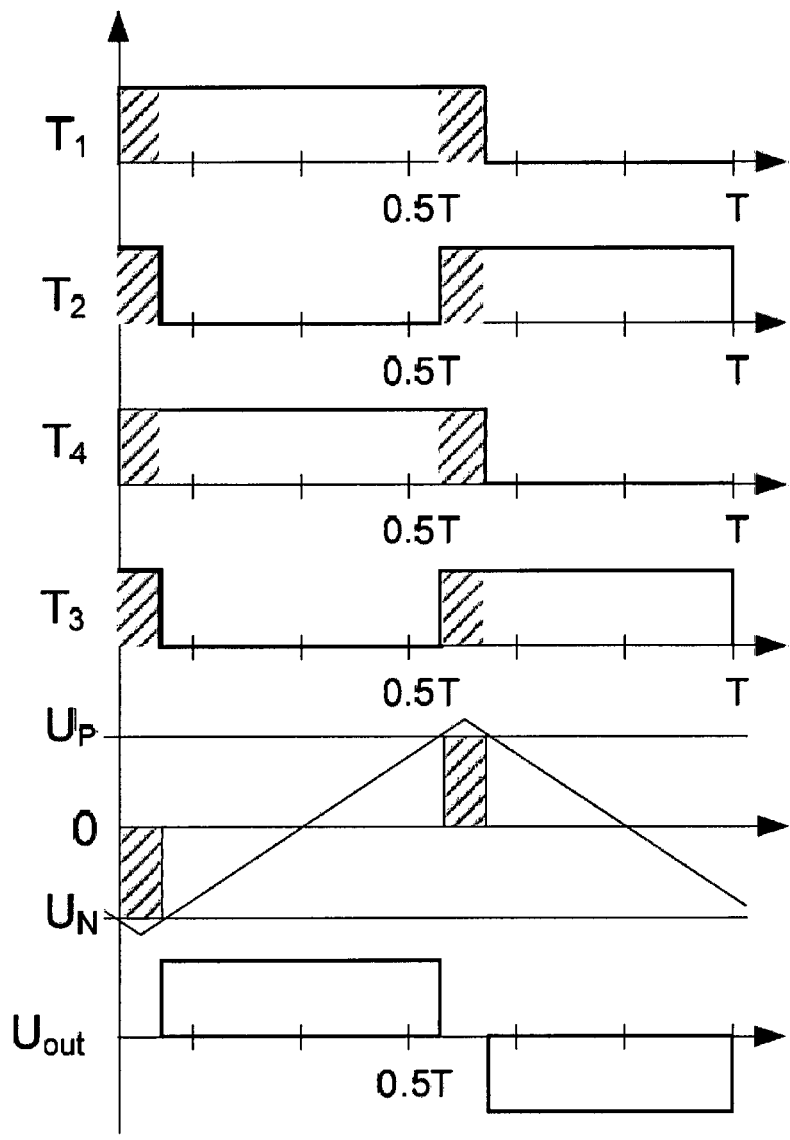
FIG. 2 depicts PWM control where shoot-through states are generated by overlapping active states.

The method for shoot-through generation by overlapping active states is depicted in FIG. 2. FIGS. 2(a) and 2(b) depict control signals of a single-phase inverter; these are called conductivity states. The relative duration of an active state per period is $D_A=1$. The duty cycle of the switching elements (T1/T4 and T2/T3) of each of the two diagonals is 0.5. To create a shoot-through state, the duty cycle of both switching element pairs is increased, resulting in overlapping active states, i.e. shoot-through active states. This results in a symmetric output voltage of the inverter (FIG. 2(e)), the amplitude of the voltage being $U_{DC}$. The switching period of this control method consists of active and shoot-through active states:

$$\frac{t_A}{T} + \frac{t_S}{T} = D_A + D_S = 1,$$

where $t_A$ and $t_S$ are durations of active and shoot-through active states, respectively, and $D_A$ and $D_S$ are relative durations of active and shoot-through active states, respectively. The formula indicates that by changing the duration of the active states of the switching elements, the duration of shoot-through active states changes automatically.

Figure 3:
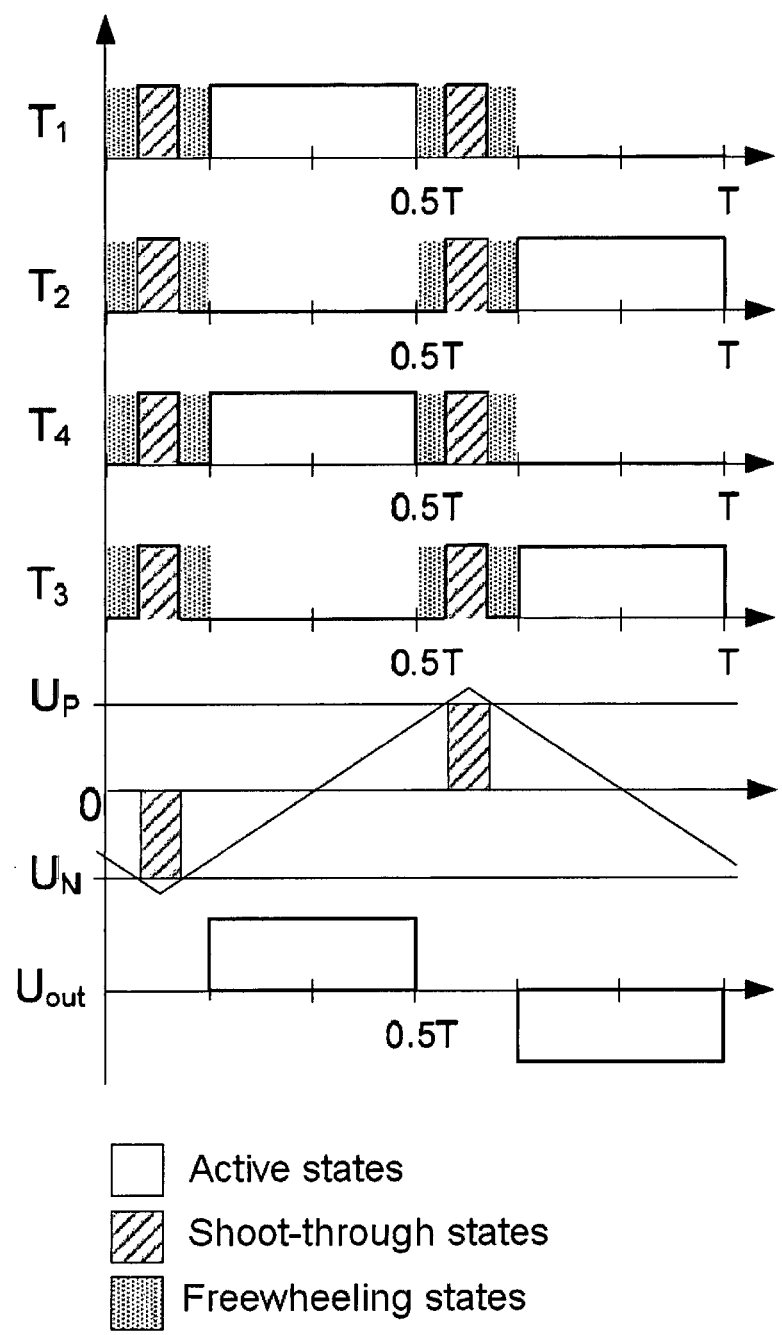
FIG. 3 depicts PWM control where shoot-through states are generated during freewheeling states.

The method for shoot-through generation during freewheeling states is depicted in FIG. 3. In this case, a shoot-through is generated during a freewheeling state where all switching elements are switched off and the current passes through freewheeling diodes. The prerequisite is that the duration of freewheeling is longer than the maximum duration of the shoot-through. The switching period consists of three parts: an active state, a shoot-through freewheeling state and a freewheeling state.

$$\frac{t_A}{T} + \frac{t_S}{T} + \frac{t_{FRW}}{T} = D_A + D_S + D_{FRW} = 1,$$

where $t_A$ and $t_{FRW}$ are durations of the active and freewheeling states, $t_S$ is the duration of the shoot-through freewheeling state, $D_A$ and $D_S$ are relative durations of active and shoot-through freewheeling states, and $D_{FRW}$ is the relative duration of the freewheeling state.

Figure 4:
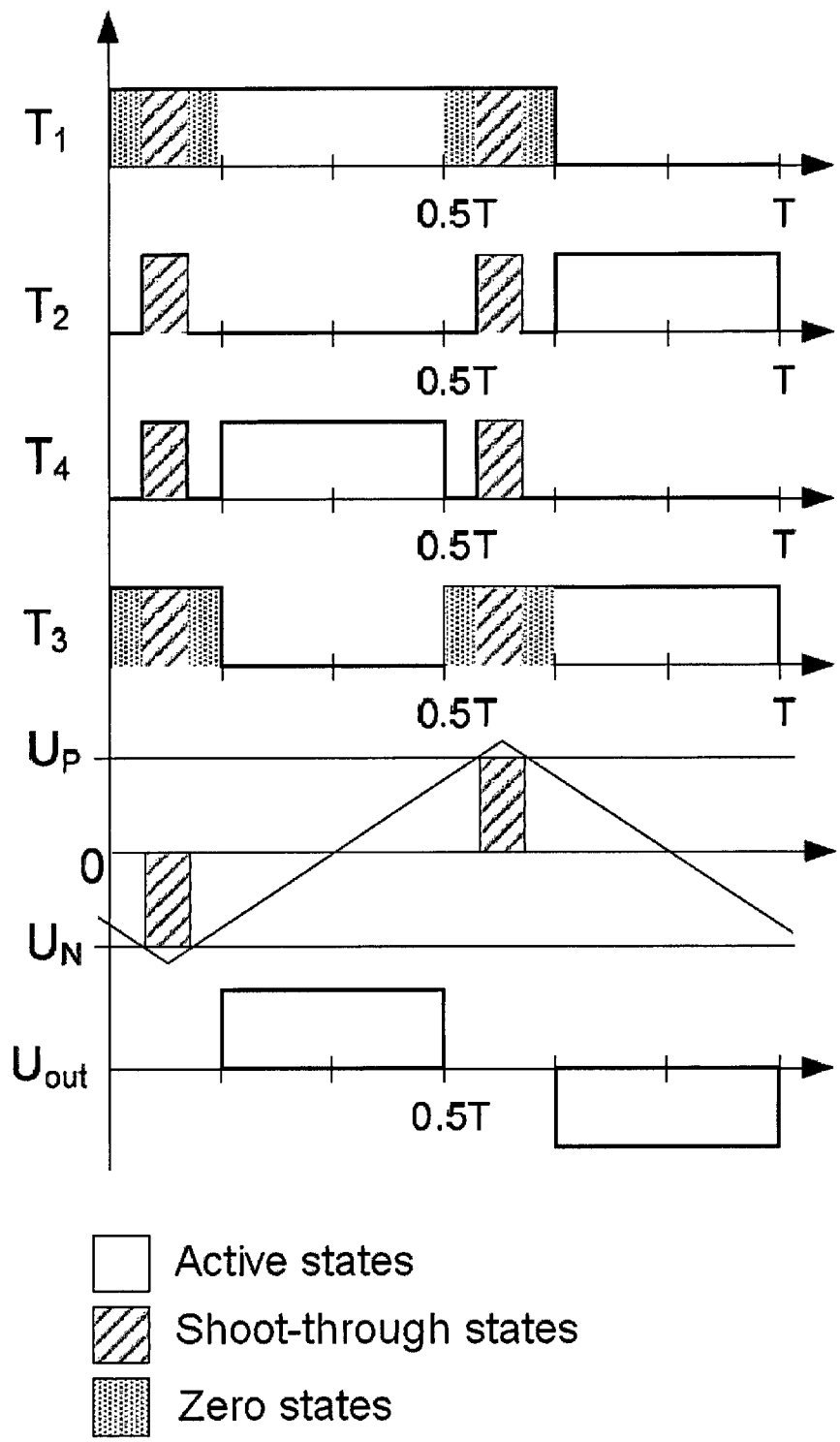
FIG. 4 depicts PWM control where shoot-through states are generated during zero states.
Figure 5:
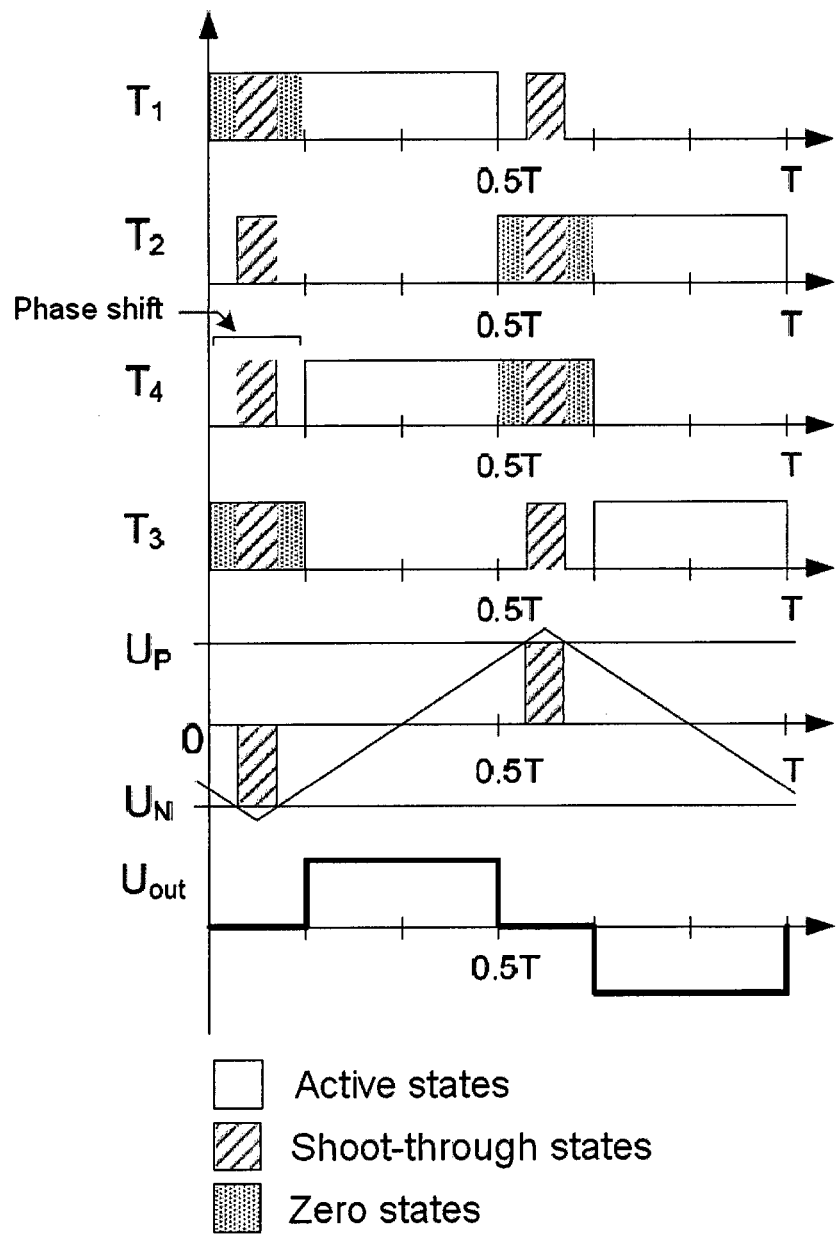
FIG. 5 depicts PSM control with shoot-through states.

If the upper (T1/T3) or lower (T2/T4) switching elements of a full bridge are switched on simultaneously, the load is short-circuited and a zero state is generated (FIG. 4). In this case, a shoot-through state is generated during a zero state. The prerequisite is that the duration of the zero state ($t_Z$) is longer than the maximum duration of the shoot-through state. The switching period consists of three parts: an active state, a shoot-through zero state and a zero state.

$$\frac{t_A}{T} + \frac{t_S}{T} + \frac{t_Z}{T} = D_A + D_S + D_Z = 1,$$

where $t_A$ and $t_Z$ are the durations of the active and zero states, $t_S$ is the duration of the shoot-through zero state, $D_A$ and $D_S$ are relative durations of active and shoot-through zero states, and $D_Z$ is the relative duration of the zero state.

Adding shoot-through zero states, changes the switching pattern of switching elements unsymmetrical, as shown in FIG. 4. The switching frequency of top and bottom side switching elements is different (FIG. 4), thus also switching losses. To improve the performance and equalize switching losses, the control signals of upper and lower switching elements are periodically interchanged e.g. the control signal of T1 is interchanged with T4 and T2 is interchanged with T3. Minimum time interval between two immediate interchanges is one switching period.

The invention claimed is:

1. A shoot-through generation method for a modified sine wave inverter, said method comprising: adding shoot-through states to at least one control signal, wherein said shoot-through states are distributed across a switching period in a way that a number of higher harmonics is minimal in a output voltage of the inverter and switching and conduction losses could be reduced and wherein at least one of said shoot-through states is generated by overlapping active states.

2. A method according to claim 1, wherein the number of shoot-through states per switching period is limited to two.

3. A method according to claim 2, wherein the switching period consists of active and shoot-through active states.

4. A method according to claim 3, wherein the duration of the active state is greater than or equal to 50% of the switching period.

5. A method according to claim 2, wherein the shoot-through freewheeling states are generated during freewheeling states.

6. A method according to claim 5, wherein the switching period consists of active, freewheeling and shoot-through freewheeling states.

7. A method according to claim 6, wherein the duration of the said shoot-through freewheeling state is less than or equal to the freewheeling state.

8. A method according to claim 2, wherein the control signals of upper and lower transistors are periodically interchanged to equalise switching losses.

\* \* \* \* \*